UNITED STATES PATENT OFFICE.

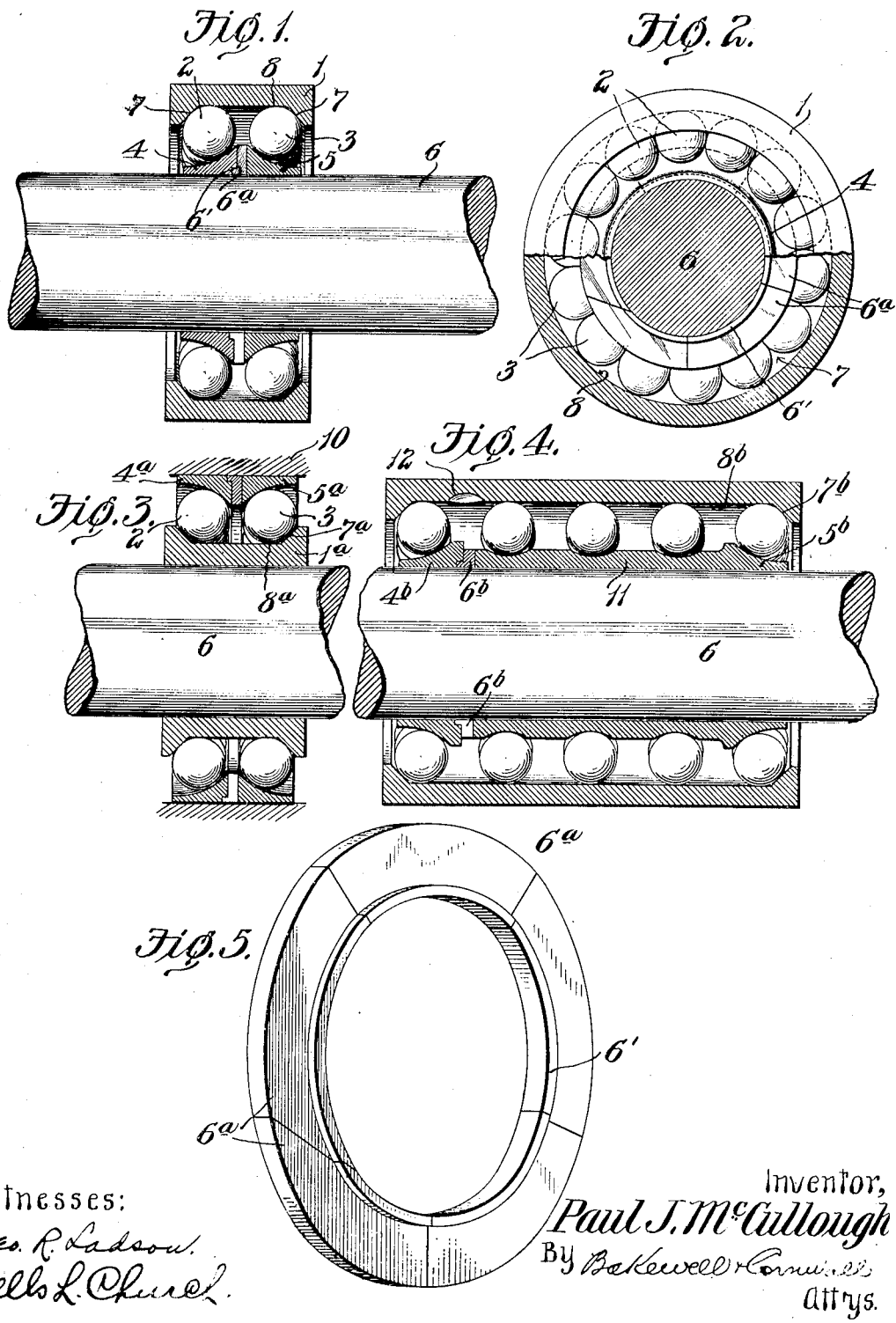

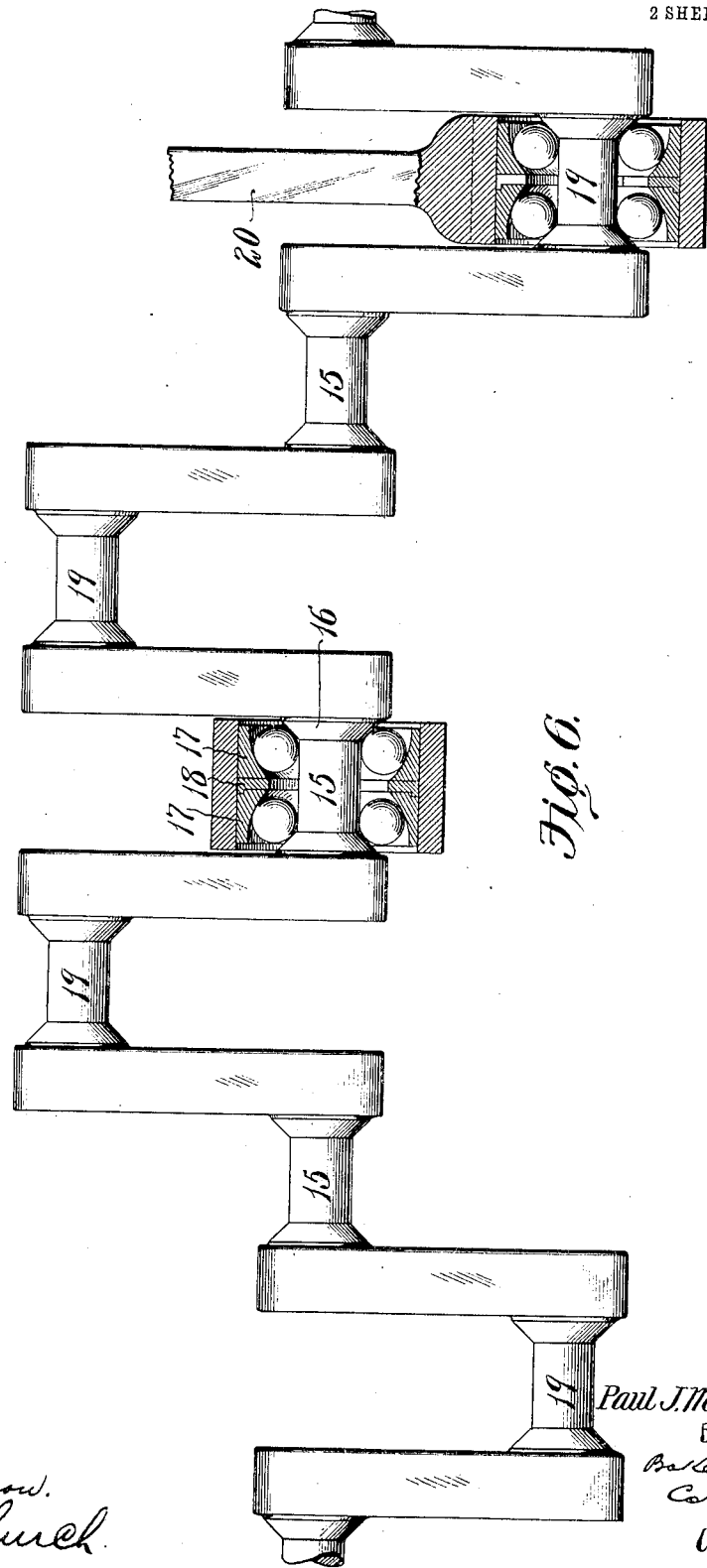

PAUL J. McCULLOUGH, OF ST. LOUIS, MISSOURI.

BALL-BEARING.

No. 871,949.  Specification of Letters Patent.  Patented Nov. 26, 1907.

Application filed February 20, 1907. Serial No. 358,401.

*To all whom it may concern:*

Be it known that I, PAUL J. MCCULLOUGH, a citizen of the United States, residing at St. Louis, Missouri, have invented a certain new and useful Improvement in Ball-Bearings, of which the following is a full, clear, and exact description, such as will enable others skilled in the art to which it appertains to make and use the same, reference being had to the accompanying drawings, forming part of this specification, in which—

Figure 1 is a sectional view of one form of my invention; Fig. 2 is an end view thereof; Fig. 3 is a sectional view of a slightly modified form; Fig. 4 is a sectional view of still another form; Fig. 5 is an enlarged detail perspective view of the spacing ring; and Fig. 6 is a view showing my improved bearing applied to the crank shaft of an engine.

This invention relates to ball bearings.

One object of my invention is to provide a ball bearing of the annular type comprising a plurality of circles of balls and ball races therefor, part of the ball races being composed of a plurality of cones and an intermediate spacing member.

Another object of my invention is to provide a ball bearing which is constructed to resist excessive lateral strains or end thrusts.

Referring to Fig. 1 of the drawings, 1 designates a ring that forms the outer member of the bearing, said ring being provided on its inner side with ball races for two circular rows of balls 2 and 3. The inner member of the bearing is formed by two cones 4 and 5 arranged as shown in Fig. 1 so that their bearing faces taper in opposite directions, each of said cones forming the inner race for one row of balls. Interposed between these cones to hold them spaced apart and at the proper distance from their coöperating ball races formed on the outer ring 1, is a spacing member or filler consisting of a ring formed from a number of sections 6ª. I form the inner member of the bearing in this manner so that I can insert both rows of balls inside of the outer ring 1, which is recessed or grooved, as hereinafter described, the balls being placed in position by first inserting the balls of row 3 and adjusting the cone 5 which forms the inner race for said row in proper position with relation to the coöperating race in the outer ring, then inserting the balls of the other row 2 between the outer race therefor in the ring 1 and the coöperating cone 4, said cone at this time being arranged close to the cone 5 so as to provide a sufficient space between the race members for the second row 2 to permit the balls of this row to be inserted. After the balls of the second row have been inserted, the cone 4 for this row is moved away from the cone 5 into proper position with relation to the outer race for the second row, and the sections 6ª of the spacing ring are then put in place to hold said cones in their adjusted position. The shaft 6 is then passed through the spacing ring and through the cones to hold said ring in position and the sections 6ª of the spacing ring are prevented from radial movement by means of flanges 6' formed thereon which are seated in an annular groove formed on the inner end face of the cone 4. When the race members wear away after the bearing has been in use for some time I remove the spacing ring and insert another spacing ring of greater thickness or I can use the original spacing ring and paste a piece of paper or other material on one of the side faces thereof, this being possible in view of the fact that the spacing ring is not subjected to any wear.

Both of the outer races in the ring 1 are two-point bearings, each of said races being provided with two bearing faces 7 and 8 which are tangential to the surfaces of the balls, the bearing faces 8 offering resistance only at right angles to the axis of rotation while the bearing faces 7 resist excessive lateral strains or end thrusts.

Each of the cones which form the inner ball races are one-point bearings, the point of tangency being the same distance from either of the two corresponding points of tangency on the outer ring 1.

If desired, the bearing can be formed as shown in Fig. 3, the outer member being composed of two cones 4ª and 5ª and an intermediate spacing ring of substantially the same construction as shown in Fig. 1, and the inner member of the bearing being formed by a ring 1ª having ball races formed on its outer surface, each of said races comprising a bearing face 8ª that offers resistance at right angles to the axis of rotation and a bearing face 7ª that resists end thrusts. In the form shown in Fig. 3 the flange on the sectional spacing ring will be formed at the outer edge of said ring to prevent the sections from moving inwardly, the ring being retained in position by the member 10 in which the bearing is mounted.

If desired, the bearing can be provided with several circular rows of balls, as shown in Fig. 4, which illustrates a bearing provided with five rows. In this form the outer member of the bearing is composed of a sleeve provided on its interior with end thrust resisting faces $7^b$, the inner surface $8^b$ of the sleeve between these faces $7^b$ constituting the bearing faces that offer resistance at right angles to the axis of rotation. The inner member of the bearing is composed of a cone $4^b$ and a cone $5^b$ having a tubular extension 11 provided on its outer face with three grooves that constitute the inner races for the three intermediate rows of balls, a spacing ring $6^b$ being arranged between the cone $4^b$ and the inner end of the tubular extension on the cone $5^b$. To permit the intermediate rows of balls to be inserted the outer member is provided on its inner surface adjacent one end with a pocket 12, as shown in Fig. 4, the intermediate rows being first inserted and then the end rows being inserted as previously described in connection with the form shown in Fig. 1. It will, of course, be obvious that the members of the form shown in Fig. 4 could be transposed in the same manner as shown in Fig. 3.

My improved bearing can be used advantageously as a bearing for the crank shaft of an engine and is a decided improvement upon the bearings which have heretofore been used for this purpose in view of the fact that its dimensions are much less than those of said bearings. My bearing can also be used for a crank shaft connecting rod and so far as I know, it is the first bearing that has been found to be practicable for this purpose.

In Fig. 6 I have illustrated my invention used as one of the bearings for a crank shaft and also as a bearing for a crank shaft connecting rod, the inner member of the bearing being composed of the crank shaft 15 having inclined faces 16 turned thereon to form portions of the inner ball races. The outer member of the bearing is composed of two cones 17 and a spacing ring 18 of substantially the same construction as shown in Fig. 3.

In the ball bearings that have heretofore been used for crank shafts, the inner member of the bearing had to be made large enough so that it could be slipped over the cranks of the shaft and consequently said inner member was of much greater diameter than the portion of the shaft it encircled when in operative position, wedges or other suitable devices being interposed between the shaft and the inner member of the bearing to connect them together. The outer member of the bearing, of course, was of still greater diameter than the inner member so that the result was an unsightly bearing of great diameter. In fact, the diameter of the bearing was so great that it was not practicable to use it as a bearing for the connecting rod so that the connecting rod was not provided with a ball bearing at the point where it encircled the crank. My bearing overcomes these objectionable features and enables a connecting rod to be provided with a ball bearing at the point where it encircles the crank, the inner member of the bearing being formed by the portion 19 of the crank which the connecting rod 20 encircles.

Having thus described my invention, what I claim as new and desire to secure by Letters Patent is:

1. A ball bearing comprising a member consisting of a single piece which is provided with an approximately channel-shaped groove that constitutes ball races, a coöperating member composed of a plurality of parts that constitute coöperating ball races, means formed in sections and arranged between said parts to hold them separated, and a plurality of rows of balls arranged between said races; substantially as described.

2. A ball bearing comprising a one-piece ring forming one member of the bearing and provided with an approximately channel-shaped groove, the side walls of which are inclined, a coöperating member composed of two cones arranged with their bases adjacent each other, a spacing member interposed between the bases of said cones and composed of a plurality of sections, and a plurality of rows of balls arranged between said cones and the groove in said ring; substantially as described.

3. A ball bearing comprising a member having a plurality of ball races, a coöperating member composed of two cones arranged with their bases adjacent each other, a spacing ring formed in sections and interposed between the bases of said cones, and a plurality of rows of balls arranged between said cones and the races in the coöperating member; substantially as described.

4. A ball bearing comprising a member having a plurality of ball races, a coöperating member composed of two cones arranged with their bases adjacent each other, a spacing ring formed in sections and interposed between the bases of said cones, a plurality of rows of balls arranged between said cones and the races in the coöperating member, and means on the sections of said ring for preventing them from moving radially in one direction; substantially as described.

5. A ball bearing comprising a member having a plurality of ball races, a coöperating member composed of two cones arranged with their bases adjacent each other, a spacing ring formed in sections and interposed between the bases of said cones, a plurality of rows of balls arranged between said cones and the races in the coöperating member, and flanges on the sections of said ring adapted to lie in an annular recess in one of said cones to prevent said sections from moving radially in one direction; substantially as described.

In testimony whereof I hereunto affix my signature in the presence of two witnesses, this fifteenth day of February 1907.

PAUL J. McCULLOUGH.

Witnesses:
WELLS L. CHURCH,
GEORGE BAKEWELL.